United States Patent
Mitra et al.

(10) Patent No.: US 10,832,178 B2
(45) Date of Patent: Nov. 10, 2020

(54) VEHICLE BOARDING CONFIRMATION

(71) Applicant: Ford Global Technologies, LLC, Dearborn, MI (US)

(72) Inventors: Pramita Mitra, West Bloomfield, MI (US); Pietro Buttolo, Dearborn Heights, MI (US); Basavaraj Tonshal, Northville, MI (US); Gary Steven Strumolo, Canton, MI (US); Qianyi Wang, Allen Park, MI (US); Kelley Lee Zechel, Plymouth, MI (US); Brian Nash, Northville, MI (US); Theodore Wingrove, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/637,855

(22) PCT Filed: Aug. 16, 2017

(86) PCT No.: PCT/US2017/047181
§ 371 (c)(1),
(2) Date: Feb. 10, 2020

(87) PCT Pub. No.: WO2019/035826
PCT Pub. Date: Feb. 21, 2019

(65) Prior Publication Data
US 2020/0250589 A1 Aug. 6, 2020

(51) Int. Cl.
| | | |
|---|---|---|
| *H04W 24/00* | (2009.01) | |
| *G06Q 10/02* | (2012.01) | |
| *H04W 4/42* | (2018.01) | |
| *H04W 4/02* | (2018.01) | |

(52) U.S. Cl.
CPC ............ *G06Q 10/02* (2013.01); *H04W 4/023* (2013.01); *H04W 4/027* (2013.01); *H04W 4/42* (2018.02)

(58) Field of Classification Search
CPC ........ G06Q 10/02; H04W 4/42; H04W 4/023; B60W 2040/0881; G05D 2201/0212; G05D 2201/0213
See application file for complete search history.

(56) References Cited

U.S. PATENT DOCUMENTS

| | | | |
|---|---|---|---|
| 7,648,194 B2 * | 1/2010 | Hirasawa | B60N 2/01508 296/203.03 |
| 8,768,565 B2 | 7/2014 | Jefferies et al. | |
| 8,874,301 B1 | 10/2014 | Rao et al. | |
| 9,439,065 B2 | 9/2016 | Cho | |
| 9,448,559 B2 | 9/2016 | Kojo et al. | |
| 9,547,309 B2 | 1/2017 | Ross et al. | |
| 9,610,893 B2 | 4/2017 | Lopez-Hinojosa et al. | |

(Continued)

OTHER PUBLICATIONS

International Search Report of the International Searching Authority for PCT/US2017/047181 dated Oct. 31, 2017.

*Primary Examiner* — Barry W Taylor
(74) *Attorney, Agent, or Firm* — Brandon Hicks; Bejin Bieneman PLC (57) ABSTRACT

A system includes a vehicle computer that is programmed to wirelessly broadcast one or more actions included in boarding of a vehicle, and receive, from a mobile device, confirmation that the one or more actions are completed. The vehicle computer is programmed to actuate a vehicle component based on the received confirmation.

15 Claims, 5 Drawing Sheets

(56) References Cited

U.S. PATENT DOCUMENTS

| | | | |
|---|---|---|---|
| 2003/0038732 A1* | 2/2003 | Watarai | G08C 19/22 |
| | | | 340/12.22 |
| 2011/0060480 A1 | 3/2011 | Mottla et al. | |
| 2011/0112969 A1 | 5/2011 | Zaid et al. | |
| 2013/0238167 A1 | 9/2013 | Stanfield et al. | |
| 2013/0324051 A1 | 12/2013 | Magarida et al. | |
| 2014/0136012 A1 | 5/2014 | Tam | |
| 2014/0333425 A1 | 11/2014 | Giraud | |
| 2015/0070131 A1 | 3/2015 | Beaurepaire et al. | |
| 2015/0120151 A1 | 4/2015 | Akay et al. | |
| 2015/0210287 A1 | 7/2015 | Penilla et al. | |
| 2015/0294298 A1 | 10/2015 | Michishita et al. | |
| 2015/0296334 A1* | 10/2015 | Smyrk | H04W 8/02 |
| | | | 455/456.3 |
| 2016/0055699 A1 | 2/2016 | Vincenti | |
| 2016/0301698 A1 | 10/2016 | Katara et al. | |
| 2016/0334797 A1 | 11/2016 | Ross et al. | |
| 2017/0101032 A1 | 4/2017 | Sugioka et al. | |
| 2017/0147959 A1 | 5/2017 | Sweeney et al. | |
| 2017/0213164 A1* | 7/2017 | Rainbolt | B60W 40/08 |
| 2017/0213165 A1 | 7/2017 | Stauffer et al. | |
| 2017/0213308 A1 | 7/2017 | Wellborn et al. | |
| 2017/0316696 A1* | 11/2017 | Bartel | B60W 50/0098 |
| 2018/0052909 A1* | 2/2018 | Sharifi | G06F 16/3326 |
| 2018/0197114 A1* | 7/2018 | Chen | G06Q 10/02 |
| 2019/0005544 A1* | 1/2019 | Hong | G06Q 50/30 |
| 2019/0043340 A1* | 2/2019 | Kayhani | H04W 4/022 |

* cited by examiner

VEHICLE BOARDING CONFIRMATION

BACKGROUND

An autonomous vehicle, i.e., a self-driving vehicle, may operate, e.g., navigate to carry passengers along a route, without intervention of a user. That is, the vehicle may operate without any human operator on board. Present technical infrastructures of autonomous vehicle are lacking with respect to determining whether passengers are on board the vehicle and/or whether the vehicle is ready to traverse a route.

DETAILED DESCRIPTION

Introduction

Disclosed herein is a system including a vehicle computer that is programmed to wirelessly broadcast one or more actions included in boarding of a vehicle, receive, from a mobile device, confirmation that the one or more actions are completed, and actuate a vehicle component based on the received confirmation.

The one or more actions may include passing through one or more specified vehicle openings.

Each opening may include at least one of a number of steps and a height of a vehicle floor.

The one or more actions may include passing a specified distance within the vehicle after passing a vehicle opening.

The system may further include the mobile device that is programmed to obtain and process mobile device sensor data to determine that the one or more actions have occurred.

The one or more actions may include one or more of a step up, a step forward, and a sit-down action.

The system may further include a first wireless transceiver mounted to an exterior of the vehicle and a second wireless transceiver mounted to an interior of the vehicle.

The vehicle computer may be further programmed to wirelessly broadcast the actions only via the first wireless transceiver.

Further disclosed herein is a method including wirelessly broadcasting one or more actions included in boarding of a vehicle, receiving, from a mobile device, confirmation that the one or more actions are completed, and actuating a vehicle component based on the received confirmation.

The method may further include determining the confirmation by determining whether one or more actions are performed.

The method may further include obtaining and processing mobile device sensor data to determine that the one or more actions have occurred.

The sensor of the mobile device may further include an accelerometer.

The method may further include wirelessly broadcasting a predetermined sequence of the actions included in boarding of the vehicle and determining the confirmation that the actions are completed based at least in part on the predetermined sequence of the actions.

The one or more actions may include passing a specified distance within the vehicle after passing a vehicle opening.

The vehicle opening data may further include at least one of a number of entry stairs and a height of vehicle floor.

The method may further include receiving, in the mobile device, the broadcasted one or more actions, and transmitting, from the mobile device, to the vehicle, the confirmation that the one or more actions are completed.

The method may further include receiving a wireless signal from vehicle wireless transceiver, and determining a presence of the mobile device in the vehicle based on the received wireless signal.

The method may further include receiving a first wireless signal from a first wireless transceiver mounted to an exterior of the vehicle, receiving a second wireless signal from a second wireless transceiver mounted to an interior of the vehicle, and determining the presence of the mobile device in the interior of the vehicle based on the received first and second wireless signal.

The method may further include determining a proximity of the mobile device relative to vehicle wireless transceiver, receiving data from a mobile device sensor, and determining the confirmation based on the determined proximity, the received data from the mobile device sensor, and the broadcasted one or more actions.

Actuating the vehicle component may further include navigating the vehicle to a predetermined destination.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

Figure 1:
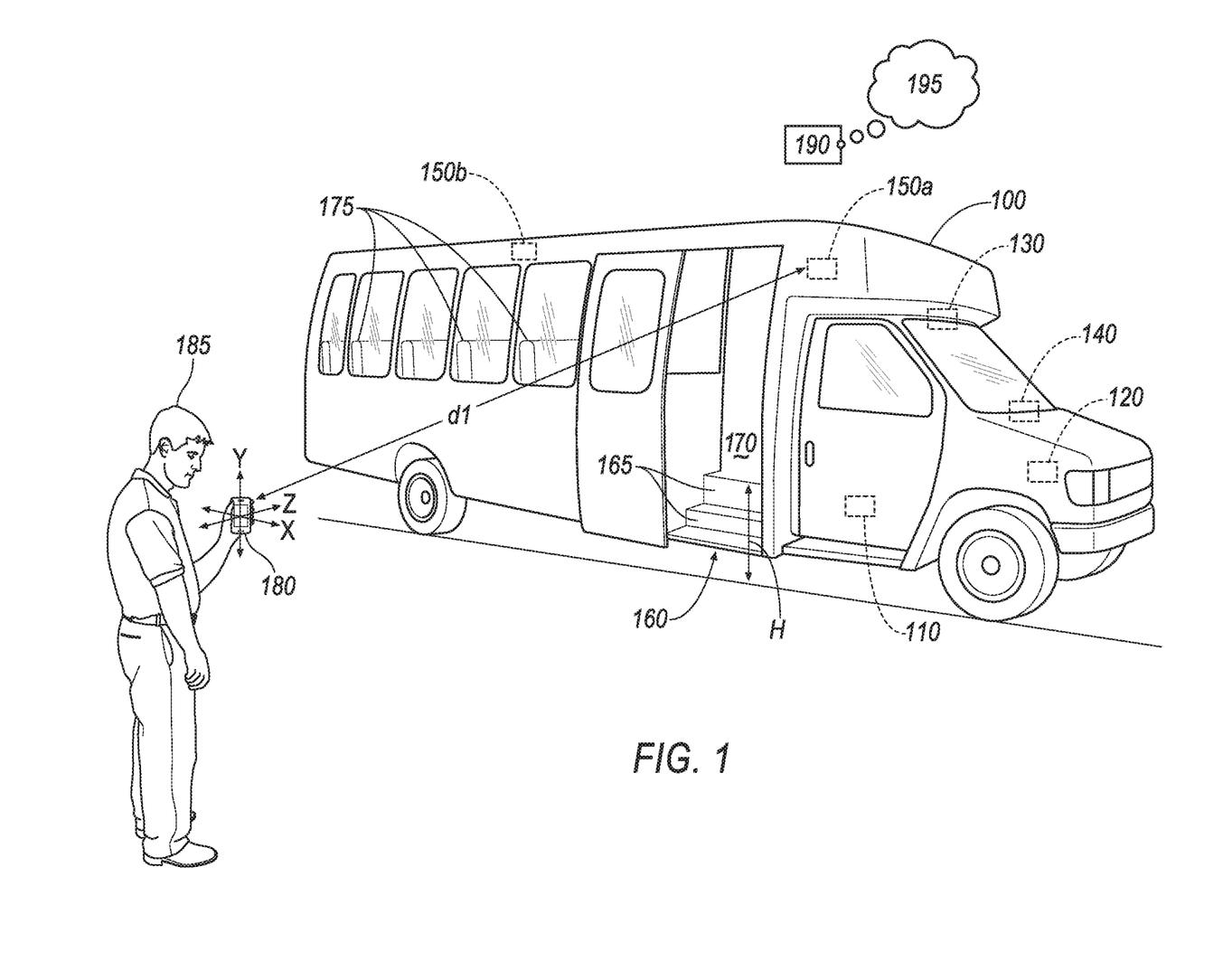
FIG. 1 is a perspective view of an exemplary autonomous vehicle control system.
Figure 2:
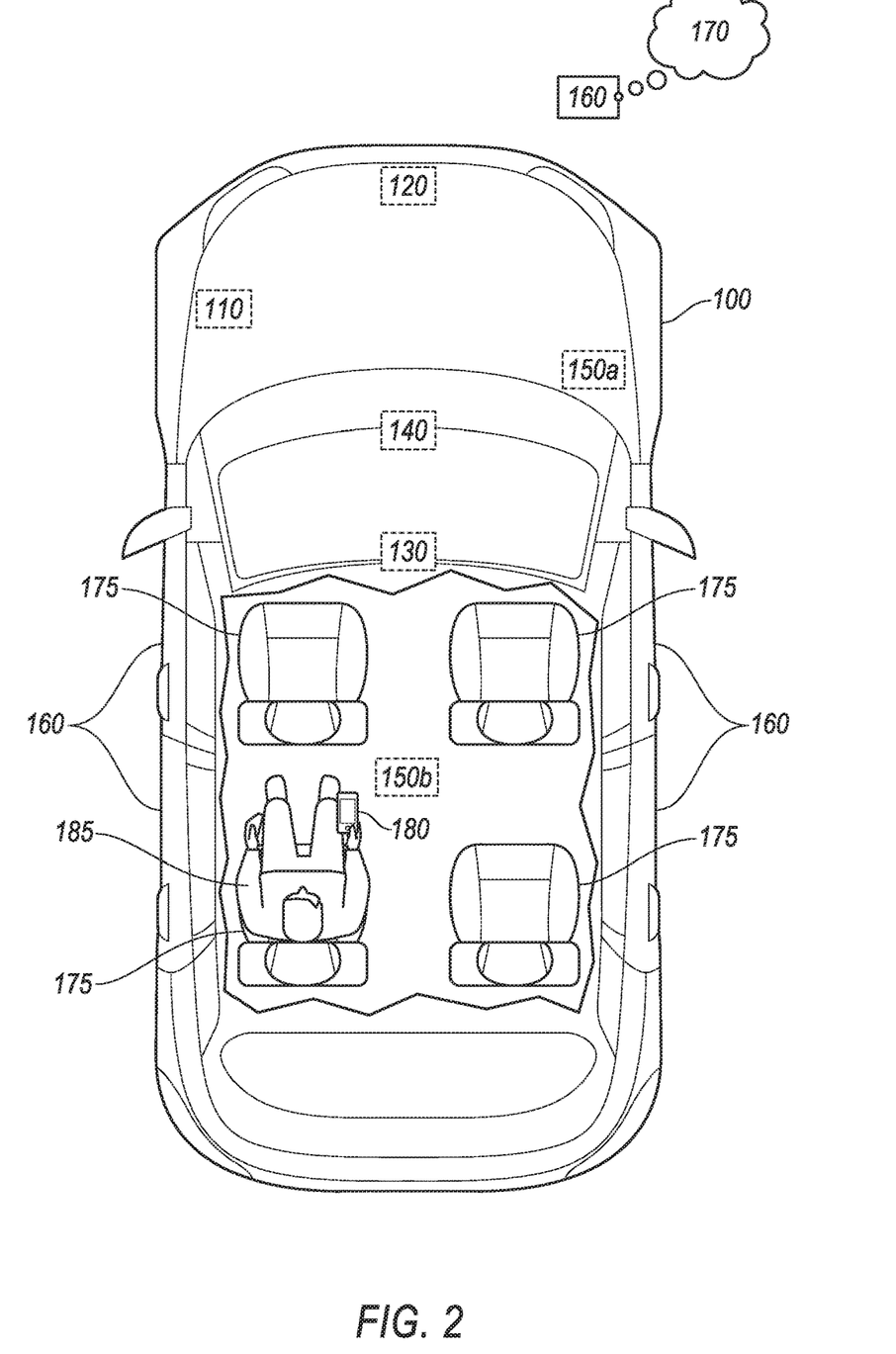
FIG. 2 is a diagram of another exemplary autonomous vehicle control system.

Referring to FIGS. 1-2, a vehicle 100 may be powered in variety of known ways, e.g., with an electric motor and/or internal combustion engine. The vehicle 100 may include a computer 110, actuator(s) 120, sensor(s) 130, and one or more wireless signal transceiver(s) 150*a*, 150*b*, each of which are discussed in more detail below. The vehicle 100 may be a bus as seen in FIG. 1, a car as seen in FIG. 2, a truck, etc.

The vehicle 100 may include one or more openings 160 for boarding the vehicle 100. The openings 160 typically include movable covers such doors or the like, i.e., may include bus door(s) (see FIG. 1), passenger vehicle doors (see FIG. 2), etc. The openings 160 may be actuated to be opened in various ways, e.g., via a mechanical handle, a push button, electrical actuation by the vehicle 100 computer 110, etc. The openings may include one or more stairs 165. For example, as shown in FIG. 1, a passenger 185 may climb multiple stairs 165 to reach the vehicle 100 floor surface 170. The floor surface 170 may have a vertical height H from a ground surface. The passenger 185 may walk over the floor surface 170 and then take a seat 175 inside the vehicle 100. As another example, as shown in FIG. 2, the passenger vehicle 100 may have multiple openings 160 and the passenger 185 may open an opening 160 and take a seat 175 without climbing any stairs. As discussed below, boarding a vehicle 100 may include various actions.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion (e.g., via a powertrain including an electric motor and/or an internal combustion engine), braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as programming to determine whether and when the computer 110, as opposed to a human operator, is to control such operations.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote computer 190, etc. The wireless communication interface may communicate via a communication network 195. The communication network 195 may include one or more wired and/or wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular such as Long-Term Evolution (LTE), Bluetooth™, IEEE 802.11, dedicated short range communications (DSRC), and/or wide area networks (WAN), including the Internet, providing data communication services. The wireless communication interface may include known electronic circuitry such as a wireless (or radio frequency) signal transmitter, a wireless (or radio frequency) signal receiver, and an amplifier circuit to boost an outgoing and incoming radio frequency signal.

Sensors 130 may include a variety of devices known to provide data via a vehicle 100 network such as a communications bus. For example, the sensors 130 may include one or more cameras, radars, and/or Light Detection and Ranging (LIDAR) sensors disposed in the vehicle 100 providing data encompassing at least some of the vehicle exterior.

The sensors 130 may also include a GPS (global positioning system) device. A GPS sensor 130 may transmit, e.g., via the computer 110, current geographical coordinates of the vehicle 100, e.g., latitude and longitude.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a control unit located in the vehicle 100, e.g., the brake controller, etc.

The vehicle 100 computer 110 may be programmed to receive, via the vehicle wireless transceiver(s) 150a, 150b, a wireless signal from the mobile device 180, and to determine a presence of the mobile device 180 within a distance di of a point on or in the vehicle 100, e.g., a location of the transceiver 150a. The computer 110 may be programmed to determine the distance di of the mobile device 180 to the vehicle 100 transceiver 150a, e.g., using techniques such as Free Space Path Loss (FSPL). The computer 110 may be programmed to determine a strength of a wireless signal of a mobile device 180 based on data received from the wireless transceiver 150a. Based on FSPL, a loss (weakening) of an electromagnetic signal over a straight path between a transmitter, e.g., the mobile device 180, and a receiver, e.g., the wireless transceiver 150a, may be proportional to the square of the distance (or distance di) between the transmitter and receiver, and also proportional to the square of a frequency of the radio signal.

For example, the computer 110 may be programmed to determine the distance di upon determining the frequency of signals transmitted by the mobile device 180 and the loss of the signal received by the wireless signal transceiver 150. The computer 110 may be programmed to determine the frequency of the received signal based on a frequency associated to a used communication protocol and/or using known Digital Signal Processing (DSP) techniques. The computer 110 may be programmed to determine a loss of the received signal based on determining the output power of the mobile device 180 and the signal strength of the received signal based on data received from the wireless signal transceiver 150.

In one example, the vehicle 100 may include multiple transceivers, e.g., a first transceiver 150a mounted to an exterior of the vehicle 100, a second transceiver 150b mounted to an interior of the vehicle 100, etc. The signal strength of the received signal at the transceivers 150a, 150b may further depend on material disposed between the mobile device 180 and the transceivers 150a, 150b. For example, a first signal strength received at the first transceiver 150a may be greater than a second signal strength received at the second transceiver 150b when the mobile device 180 is outside the vehicle 100. The material of vehicle 100 body may weaken the signal strength when the vehicle 100 body is disposed between the transceiver 150b and the mobile device 180. As another example, the first signal strength received at the first transceiver 150a may be less than the second signal strength received at the second transceiver 150b when the mobile device 180 is inside the vehicle 100.

The mobile device 180 may communicate with the computer 110 via the transceivers 150a, 150b. The mobile device 180 may be a smartphone or wearable computer communicating via the network 195. The mobile device 180 may include input mechanisms to, e.g., input a destination coordinate, etc., and output mechanisms to, e.g., output a visual and/or audio information to the user. The mobile device 180 may include one or more sensors such as accelerometer sensors to determine a displacement acceleration of the device 180. In one example, illustrated in FIG. 1, the device 180 accelerometer sensor may determine longitudinal, lateral, and/or vertical accelerations $a_X$, $a_Y$, $a_Z$ of the device 180. As discussed below with reference to FIGS. 3-5, the mobile device 180 may be programmed to determine based at least in part on data received from the device 180 sensors whether the passenger 185 carrying the device 180 boarded the vehicle 100. The mobile device 180 may include a GPS (Global Positioning System) sensor. The computer 110 may determine a location of the mobile device 180 based on location coordinates determined via the GPS sensor.

The vehicle 100 may be operated to transport passenger(s) 185 to one or more predetermined destination(s). The vehicle 100 may be operated without a human operator. Thus, prior to actuating the vehicle 100 actuators 120 to move the vehicle 100, the computer 110 may determine whether passenger(s) 185 have boarded the vehicle 100 and/or are seated in the vehicle 100 seats 175. In one example, the vehicle 100 computer 110 is programmed to wirelessly broadcast, e.g., a list of, action(s) included in boarding of the vehicle 100, and receive, from the mobile device(s) 180, confirmation that the action(s) are completed. The computer 110 is further programmed to actuate a vehicle 100 component, e.g., transmission controller, based on the received confirmation. "Confirmation that the actions are complete" means confirming that actions from the list of actions are, at least in part, completed, and moreover completed simultaneously and/or according to a specified sequence for the actions, as discussed below.

Action(s), in the context of present disclosure, are physical activities or movements of a passenger 185 that boards the vehicle 100. Actions may include approaching the vehicle 100, e.g. walking to the vehicle 100, opening a door of a vehicle 100 opening 160, e.g., via actuating a mechanical or electrical interface, passing through one or more specified vehicle 100 openings 160, stepping up, e.g., climbing a stair 165, stepping forward, and/or sitting down. The actions, in the present context, may further include passing a specified distance within the vehicle 100 after passing a vehicle 100 opening 160, e.g., a predetermined minimum distance between the opening 160 and a seat 175 in the vehicle 100.

Table 1 shows an example sequence of actions for a passenger 185 boarding a vehicle 100. In this example, the actions are executed in a sequence starting from the "approaching" action in the top row of Table 1 and then sequentially continuing to the "sitting" action in the bottom row of Table 1. Each row includes an action and a description of related sensor data, i.e., data that can be analyzed to identify or determine that the action has been performed. The mobile device 180 may be programmed to confirm passenger 185 boarding is completed by determining whether the actions included in a passenger 185 boarding process, e.g., as shown in Table 1, are completed. In one example, the mobile device 180 may be programmed to determine whether the actions are completed based on the received related sensor data for each action such as the longitudinal, lateral, and/or vertical accelerations $a_X$, $a_Y$, $a_Z$, as discussed below with reference to FIGS. 3-5.

TABLE 1

| Action | Description | Related sensor data |
|---|---|---|
| Approaching | Reducing a distance of the mobile device to the vehicle | Location coordinates of the vehicle and the mobile device, strength of signal received at vehicle transceiver |
| Opening door | Mechanically and/or electrically actuating the vehicle opening to open | Vehicle sensors, e.g., switches |
| Stepping up | Going up the stairs | Accelerometer of mobile device |
| Step forward | Walking outside and/or inside the vehicle | Acceleration of mobile device, location coordinates of the mobile device and the vehicle, strength of signal received at vehicle transceiver |
| Sitting | The physical movement of the passenger to move from standing position to sitting position at a vehicle seat | Acceleration of the mobile device |

The vehicle 100 computer 110 may be programmed to wirelessly broadcast the list of actions, e.g., to the passenger 185 mobile devices 180. The computer 110 may be programmed to transmit the list of actions based on a known format such as Extensible Markup Language (XML). In one example, the computer 110 may be programmed to broadcast the list of actions via the first wireless transceiver 150a that is mounted to an exterior of the vehicle. Thus, the mobile device 180 may be programmed to, and may, receive the actions prior to boarding of the passenger 185. The actions associated with the vehicle 100 may be based on physical properties of the vehicle 100, e.g., the openings 160, the height H of vehicle 100 floor surface 170, number of stairs 165 associated with each opening 160, location and/or distance of seats 175 relative to the openings 160, shape and/or height of seats 175, an orientation of the seats 175 relative to, e.g., a vehicle 100 longitudinal axis, etc. For example, with reference to FIG. 1, the passenger 185 may climb the stairs 165 and walk on the floor 170 when boarding the vehicle 100, whereas, as shown in FIG. 2, the passenger 185 may board the passenger vehicle 100 without climbing any stairs 165 or walking inside the vehicle 100.

Boarding the vehicle 100 may include completing a defined set of actions from the list of actions. For example, boarding a bus may include actuating the bus door to open. In one example, though, if the bus door is already open, e.g., because another passenger is boarding or has just boarded, then the door opening action may be unnecessary. Additionally, a boarding of the vehicle 100 may include completion of the actions in a predetermined sequence. The computer 110 may be programmed to wirelessly broadcast a predetermined sequence of the actions included in boarding of the vehicle 100 and determine the confirmation that the actions are completed based at least in part on the predetermined sequence of the actions. For example, a sequence of actions may include approaching the vehicle 100, stepping up the stairs 165, walking to a seat 175, and sitting down. Thus, the boarding of the vehicle 100 may include completing the actions in the given sequence.

The mobile device 180 may be programmed to receive data including the actions and/or one or more sequences of actions associated with the vehicle 100, e.g., from the vehicle 100 transceiver 150a. The mobile device 180 may be programmed to obtain and process mobile device 180 sensor data to determine whether the predetermined action(s) have occurred.

As discussed above, the vehicle 100 may include multiple transceivers 150, e.g., the first transceiver 150a mounted to the exterior and the second transceiver 150b mounted to the interior of the vehicle 100. In one example, the computer 110 may be programmed to broadcast the actions only via the first transceiver 150a and the mobile device 180 outside the vehicle 100 may receive and store the actions. The mobile device 180 may then confirm the completion of each of the actions included in the boarding of the vehicle 100 based on received sensor data.

The mobile device 180 may be programmed to determine whether the mobile device 180 is approaching the vehicle 100 by determining a change (i.e., reduction) of the distance di between the vehicle 100 and the mobile device 180. For example, the mobile device 180 may be programmed to confirm an "approaching" action with respect to the vehicle 100 based on changes of wireless signal strength, as discussed above, and/or location coordinates of the vehicle 100 and the mobile device 180. In one example, the mobile device 180 transmits a wireless signal that is received at the vehicle 100 first wireless transceiver 150b. The computer 110 can be programmed to receive the wireless signal and measure a strength of the received signal. The computer 110 may be further programmed to transmit a signal to the mobile device 180 including the measured strength. Thus, the mobile device 180 may be programmed to determine an approaching action based on received changes of wireless signal strength.

Figure 3:
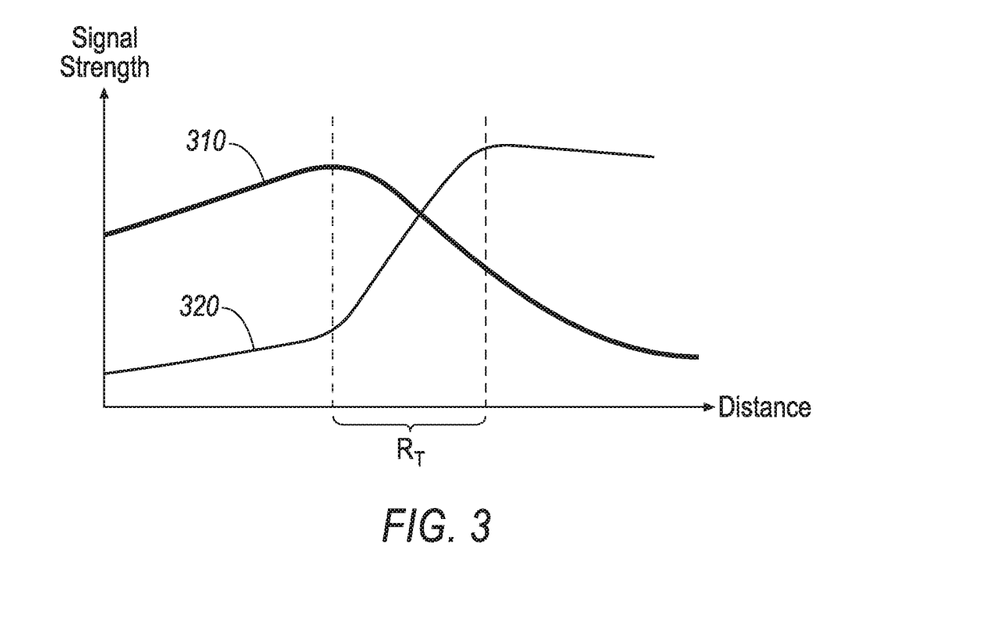
FIG. 3 is an exemplary graph of wireless signal strength received at transceivers mounted to an interior and an exterior of a vehicle.

The mobile computer 180 may be programmed to receive a first wireless signal from a first wireless transceiver 150a mounted to an exterior of the vehicle and to receive a second wireless signal from a second wireless transceiver 150b mounted to an interior of the vehicle, and determine the presence of the mobile device 180 in the vehicle 100 based on the received first and second wireless signal. In one example, the graphs 310, 320 in FIG. 3 show a change of wireless signal strength relative to a distance between the device 180 and, e.g., a center point of the vehicle 100. Graphs 310, 320 depict changes of received signal strength at the transceivers 150a, 150b respectively. As discussed above, the vehicle 100 body material may weaken the received signal at the transceiver 150b when the mobile device 180 is outside the vehicle 100. Similarly, the received signal strength at the transceiver 150a is weakened when the mobile device 180 is inside the vehicle 100. As shown in FIG. 3, in a transition range $R_T$ the strength of signal received by the first transceiver 150a reduced, while the strength received at the interior transceiver 150b increases. In one example, the computer 110 may be programmed to determine the presence of the mobile device 180 in the vehicle 100 upon determining that the signal strength at transceiver 150a is less than the signal strength of the transceiver 150b.

Figure 4:
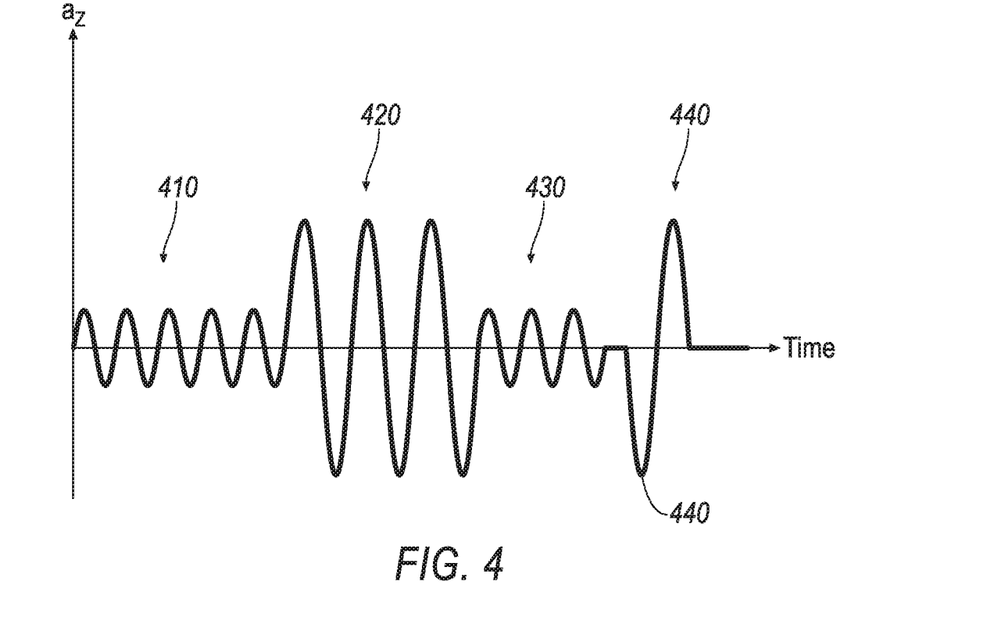
FIG. 4 is an exemplary graph of vertical displacement acceleration of a mobile device.

With reference to Table 1, the actions may include a passenger 185 climbing or stepping up the stairs 165. FIG. 4 is an example graph depicting vertical acceleration $a_Z$ versus time of an example vehicle 100 stair-climbing action. Movements of the passenger 185 carrying the device 180 may include change(s) in longitudinal, lateral, and/or vertical accelerations $a_X$, $a_Y$, $a_Z$. For example, segments 410, 420, 430, 440 in the graph of FIG. 3 show example changes of vertical acceleration $a_Z$ caused by approaching 410 the vehicle 100, stepping up 420 the stairs 165, walking 430 inside the vehicle 100 to a seat 175, and sitting 440 on the seat 175.

Segments 410 and 430 show example vertical accelerations $a_Z$ caused by a passenger 185 stepping forward and/or backward. Segment 420 shows example vertical accelerations that may indicate a passenger 185 stepping up the stairs 165. For example, the mobile device 180 may be programmed to determine a passenger 185 stepping up the stairs 165 at times $t_1$, $t_2$, $t_3$ based on the example graph segment 420. The mobile device 180 may identify a stepping up action based on a peak of the vertical acceleration $a_Z$ exceeding a predetermined threshold at times and/or based on a shape of the graph. In one example, the mobile device 180 may be programmed to determine a number of stairs 165 climbed based on a number of peaks at the segment 420.

In order to improve the determination of the passenger 185 presence in the vehicle 100, the mobile device 180 may be programmed to determine the presence of the mobile device 180 in the vehicle 100 based on a combination of the wireless signal strength as discussed with reference to FIG. 3 and the determination of stepping up the stairs 165 as discussed with reference to FIG. 4. In one example, the mobile device 180 may be programmed to determine the presence of the mobile device 180 in the vehicle 100 upon determining that strength of signal received by transceiver 150b exceeding strength of signal received by the transceiver 150a (see FIG. 3) and stepping up the stairs 165 (see FIG. 4), coincide. "Coincide" as is conventionally understood, and in this disclosure, means both actions (events) occur within a same time window. For example, passing the transition range $R_T$ (see FIG. 3) occurs at a time between $t_1$ and $t_3$ (see FIG. 4). In another example, the mobile device 180 may be programmed to determine the presence of the mobile device 180 in the vehicle 100 upon determining that strengths of signals received by transceivers 150a, 150b being within the transition range $R_T$ (see FIG. 3), and stepping up the stairs 165 (see FIG. 4), coincide.

Segment 440 of the example graph depicts a vertical acceleration $a_Z$ toward the ground surface. In one example, the mobile device 180 may be programmed to determine a sitting action of the passenger 185 based at least in part on the vertical acceleration $a_Z$ shown in segment 440.

The mobile device 180 may be programmed to determine a proximity of the mobile device 180 relative to the vehicle 100 wireless transceiver 150a, 150b. The mobile device 180 may be further programmed to receive data from the mobile device 180 sensor such as the accelerometer, and determine the confirmation based on the determined proximity, the received data from the mobile device 180 sensor, and the broadcasted one or more actions. The mobile device 180 can be programmed to transmit, to the vehicle 100, the confirmation that the actions are completed. For example, regarding Table 1, the mobile device 180 may transmit the confirmation upon determining that the actions listed in Table 1 are completed in the given sequence shown in Table 1. Additionally or alternatively, the vehicle 100 computer 110 may be programmed to receive sensor data from the mobile device 180 and determine the confirmation that the actions are completed.

Upon boarding the passenger(s) 185, the vehicle 100 may start to move. In one example, the computer 110 may actuate vehicle 100 actuators 120 to move the vehicle 100 along a route to a destination. The computer 110 may determine the route using known navigation techniques, based on destination input received via the HMI 140. Thus, the computer 110 may be programmed to actuate vehicle 100 actuators 120, e.g., powertrain, brakes, and steering actuators, to navigate the vehicle 100 to the destination. In another example, the computer 110 may actuate the actuators 120 to drive the vehicle 100 in a non-autonomous mode, e.g., based on user input. The vehicle 100 may be shared by multiple passenger(s) 185 and the computer 110 may be programmed to actuate the vehicle 100 to move upon determining that all passengers 185 have completed boarding, i.e., actions associated with boarding is completed for each of the passengers 185.

Processing

Figure 5:
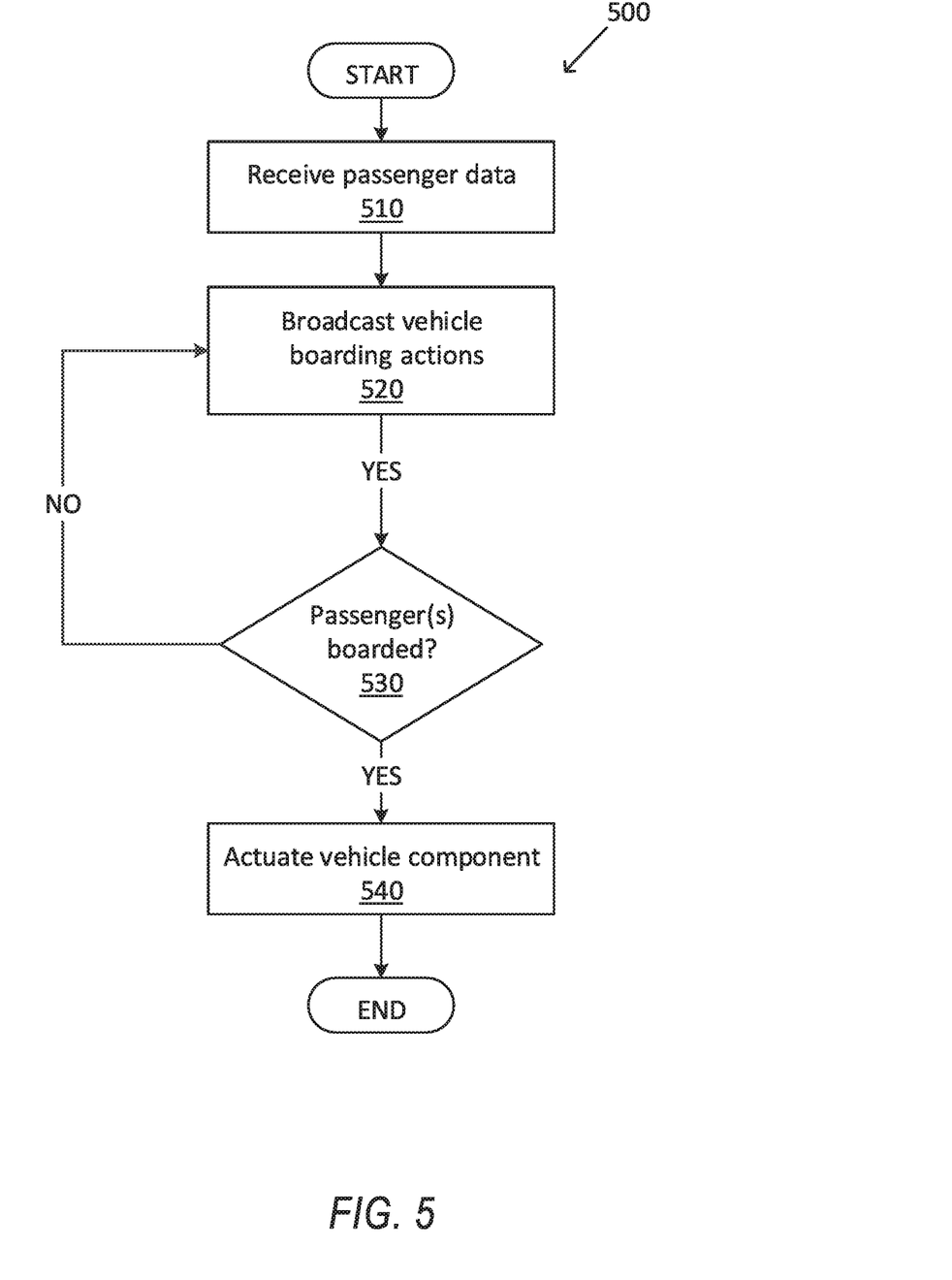
FIG. 5 is a flowchart of an exemplary process for broadcasting boarding actions and navigating a vehicle.

FIG. 5 is a flowchart of an exemplary process 500 for broadcasting boarding actions and navigating the vehicle 100. For example, the computer 110 may be programmed to execute blocks of the process 500.

The process 500 begins in a block 510, in which the computer 110 receives passenger 185 data, e.g., from the remote computer 190. Passenger 185 data may include identifier(s) of the mobile devices 180 associated with the vehicle 100 passengers 185. The passenger 185 data may further include location coordinates of location where the passengers 185 are expected to board.

Next, in a block 520, the computer 110 broadcasts vehicle 100 boarding actions. For example, the computer 110 may be programmed to broadcast boarding actions listed in Table 1. Additionally, the computer 110 may be programmed to broadcast a predetermined sequence for the boarding actions, e.g., a sequence (i.e., an ordered set of steps or items) of completing the actions listed in Table 1 in an order from top to bottom of Table 1. Additionally, the computer 110 may be programmed to transmit the identifier(s) of mobile device(s) 180 expected to board the vehicle 100 at a current location. For example, the computer 110 may be programmed to determine the expected mobile devices 180 based on the received passenger 185 data and current location coordinates of the vehicle 100, e.g., received from the vehicle 100 GPS sensor 130.

Next, in a decision block 530, the computer 110 determines whether the passenger(s) 185 boarded, e.g., based on data received from the mobile devices 180 associated with the passengers 185. As discussed with reference to FIG. 6, the mobile devices 180 may be programmed to transmit the data including confirmation that the broadcasted list of actions are completed, to the vehicle 100 computer 110. The computer 110 may be programmed to receive confirmation(s) from the respective mobile devices 180, e.g., via the network 195. If the computer 110 determines that the confirmation(s) are received, then the process 500 proceeds to a block 540, otherwise the process 500 returns to the block 520.

In the block 540, the computer 110 actuates vehicle 100 components. For example, the computer 110 may be programmed to actuate vehicle 100 actuators 120 to navigate the vehicle 100 to the predetermined destination in the autonomous mode. Additionally or alternatively, the vehicle 100 may be operated in the non-autonomous mode. In the non-autonomous mode an operator may operate the vehicle 100, and confirmation of completing the boarding actions may be beneficial for the operator prior to manually actuating the vehicle 100 to navigate to the destination.

Following the block 540, the process 500 ends, or alternatively returns to the block 510, although not shown in FIG. 5.

Figure 6:
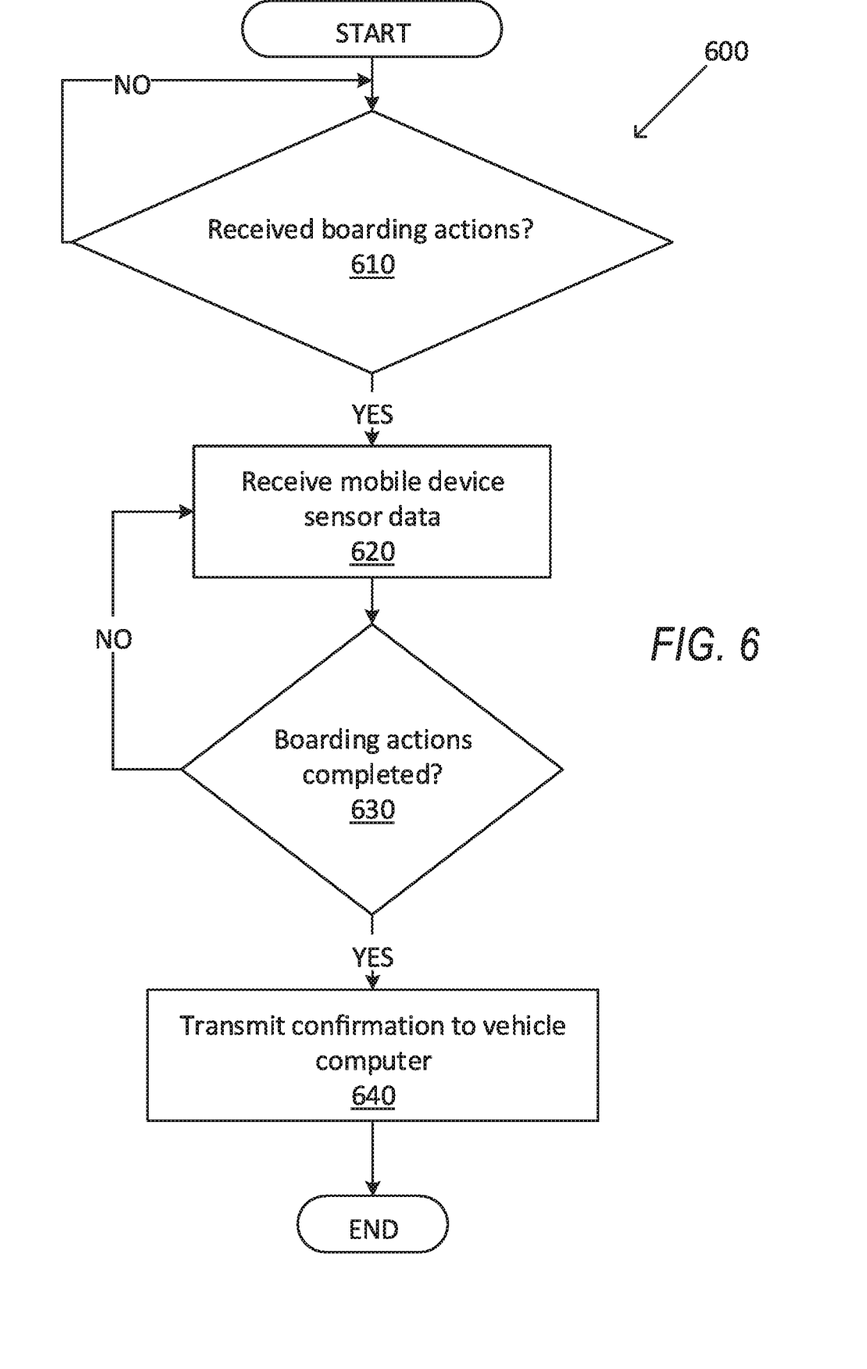
FIG. 6 is a flowchart of an exemplary process for confirming passenger boarding actions.

FIG. 6 is a flowchart of an exemplary process 600 for confirming the completion of passenger 185 boarding actions. For example, a processor included in the mobile device 180 may be programmed to execute blocks of the process 600.

The process 600 begins in a decision block 610, in which the mobile device 180 processor determines whether boarding action(s) are received. For example, the mobile device 180 may be programmed to receive the boarding actions from the vehicle 100 via the network 195. Additionally, the mobile device 180 may be programmed to receive one or more sequences of actions associated with the boarding of the vehicle 100. Additionally, the mobile device 180 may be programmed to receive an identifier of the mobile devices 180 associated with the vehicle 100 and determine whether the mobile device 180 is associated with the vehicle 100 based on the received identifiers. If the mobile device 180 determines that the boarding actions for the mobile device 180 are received, then the process 600 proceeds to a block 620; otherwise the process 600 returns to the decision block 610.

In the block 620, the mobile device 180 processor receives sensor data from the mobile device 180 sensors. For example, the mobile device 180 processor may be programmed to receive longitudinal, lateral, and/or vertical accelerations $a_X$, $a_Y$, $a_Z$ from the mobile device 180 accelerometer. Additionally, the mobile device 180 processor may receive data including wireless signal strength from the vehicle 100, as discussed above.

Next, in a decision block 630, the mobile device 180 processor determines whether the boarding actions are completed. For example, the mobile device 180 processor may be programmed to determine based on the received actions, the strength of wireless signals, the sensor data of the mobile device 180, etc. whether the boarding actions are completed. Additionally, the mobile device 180 processor may be programmed to determine whether the actions are completed in a specified sequence received from the vehicle 100 computer 110. If the mobile device 180 processor determines that the boarding actions are completed, then the process 600 proceeds to a block 640; otherwise the process 600 returns to the block 620.

In the block 640, the mobile device 180 processor transmits the confirmation to the vehicle 100 computer 110, e.g., via the network 195. Following the block 640, the process 600 ends, or alternatively returns to the decision block 610, although not shown in FIG. 6.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a vehicle computer including a processor and a memory, the memory storing instructions executable by the processor to:
   wirelessly broadcast a predetermined sequence of a plurality of actions to be physically completed by a passenger to board a vehicle, the plurality of actions including passing through one or more specified vehicle openings and moving toward a vehicle seat;
   receive, from a mobile device, confirmation that the plurality of actions are completed by the passenger according to the predetermined sequence, the confirmation based on mobile device sensor data collected by the mobile device; and
   actuate a vehicle component based on the received confirmation.

2. The system of claim 1, wherein each opening includes at least one of a number of steps and a height of a vehicle floor.

3. The system of claim 1, wherein the one or more actions include passing a specified distance within the vehicle after passing through the one or more specified vehicle openings.

4. The system of claim 1, wherein the one or more actions include one or more of a step up, a step forward, and a sit-down action.

5. The system of claim 1, further comprising a first wireless transceiver mounted to an exterior of the vehicle and a second wireless transceiver mounted to an interior of the vehicle.

6. The system of claim 5, wherein the instructions further include instructions to wirelessly broadcast the actions only via the first wireless transceiver.

7. A method, comprising:
   wirelessly broadcasting a predetermined sequence of a plurality of actions to be physically completed by a passenger to board a vehicle, the plurality of actions including passing through one or more specified vehicle openings and moving toward a vehicle seat;
   receiving, from a mobile device, confirmation that the plurality of actions are completed by the passenger according to the predetermined sequence, the confirmation based on mobile device sensor data collected by the mobile device; and
   actuating a vehicle component based on the received confirmation.

8. The method of claim 7, wherein the mobile device further includes an accelerometer, and the mobile device sensor data include data from the accelerometer.

9. The method of claim 7, wherein the one or more actions include passing a specified distance within the vehicle after passing a vehicle opening.

10. The method of claim 9, wherein the vehicle opening data further include at least one of a number of entry stairs and a height of vehicle floor.

11. The method of claim 7, further comprising:
    receiving, in the mobile device, the broadcasted predetermined sequence; and
    transmitting, from the mobile device, to the vehicle, the confirmation that the plurality of actions are completed.

12. The method of claim 7, further comprising:
    receiving a wireless signal from vehicle wireless transceiver; and
    determining a presence of the mobile device in the vehicle based on the received wireless signal.

13. The method of claim 12, further comprising
    receiving a first wireless signal from a first wireless transceiver mounted to an exterior of the vehicle;
    receiving a second wireless signal from a second wireless transceiver mounted to an interior of the vehicle; and
    determining the presence of the mobile device in the interior of the vehicle based on the received first and second wireless signal.

14. The method of claim 7, further comprising:
    determining a proximity of the mobile device relative to vehicle wireless transceiver;
    receiving data from a mobile device sensor; and
    determining the confirmation based on the determined proximity, the received data from the mobile device sensor, and the broadcasted one or more actions.

15. The method of claim 7, wherein actuating the vehicle component further includes navigating the vehicle to a predetermined destination.

* * * * *